R. M. AUSTIN.
COOKING UTENSIL.
APPLICATION FILED FEB. 14, 1907.
913,450.
Patented Feb. 23, 1909.
2 SHEETS—SHEET 1.
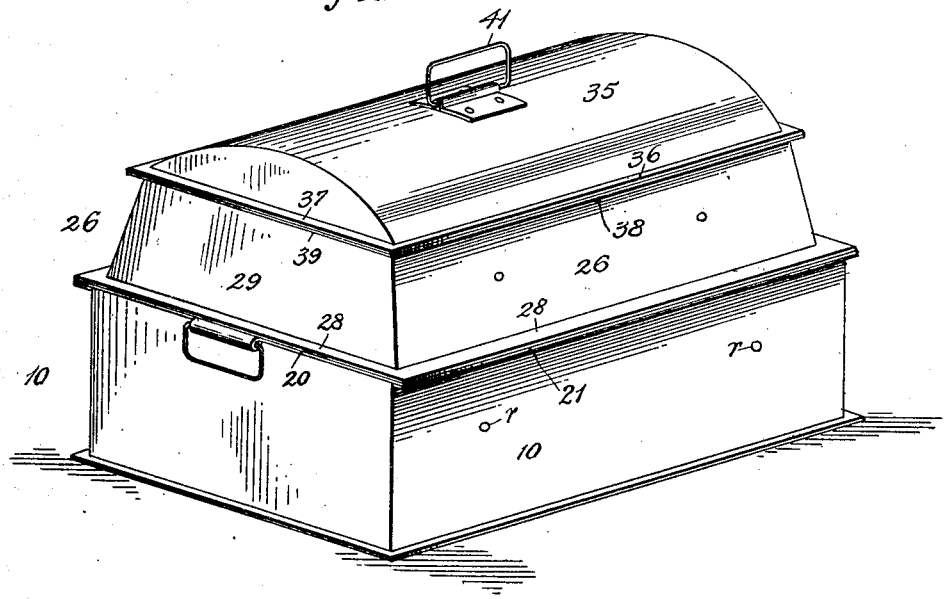
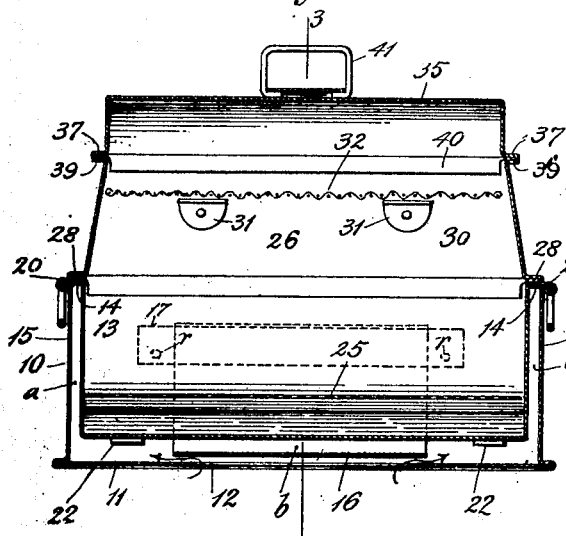
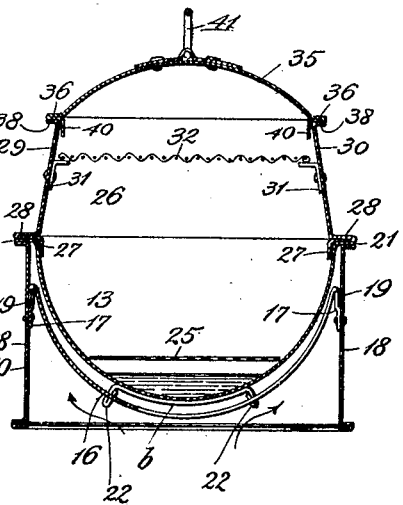
WITNESSES:
INVENTOR.
Robert M. Austin,
BY
ATTORNEY.

R. M. AUSTIN.
COOKING UTENSIL.
APPLICATION FILED FEB. 14, 1907.

913,450.

Patented Feb. 23, 1909.
2 SHEETS—SHEET 2.

WITNESSES:

INVENTOR.
Robert M. Austin,
BY
ATTORNEY.

UNITED STATES PATENT OFFICE.

ROBERT M. AUSTIN, OF HARTFORD, CONNECTICUT.

COOKING UTENSIL.

No. 913,450.  Specification of Letters Patent.  Patented Feb. 23, 1909.

Application filed February 14, 1907. Serial No. 357,341.

*To all whom it may concern:*

Be it known that I, ROBERT M. AUSTIN, a citizen of the United States, and resident of Hartford, in the county of Hartford and State of Connecticut, have invented certain new and useful Improvements in Cooking Utensils, of which the following is a full, clear, and exact specification.

This invention relates to cooking utensils, and more especially to that class thereof which are generally known as "roasters", and it has for one of its objects the provision of such a device, in which the steam generated in the main or roasting compartment, may be utilized for cooking other food at the same time.

My invention has, furthermore, for its object the provision of a roaster comprising a plurality of superposed sections which may be readily separated from each other, and yet will constitute a substantially tight utensil in which the steam will be prevented from escaping.

A further object of the invention resides in the peculiar construction of the main compartment or roasting pan, which is provided with what may be termed a "round bottom", to receive the juices and liquids in a comparatively narrow but correspondingly deep space, and thus obviate the annoyance of a too rapid evaporation or generation of steam.

My invention has, furthermore, for its object the combination, with the sectional roaster, of a heating chamber for receiving the major portion thereof and adapted to be placed on top of a range, and which will, furthermore, constitute an oven for conducting heat not only to the bottom of the roaster, but to its sides as well.

Further objects of the invention will hereinafter appear and be particularly pointed out in the claims.

Figure 4:
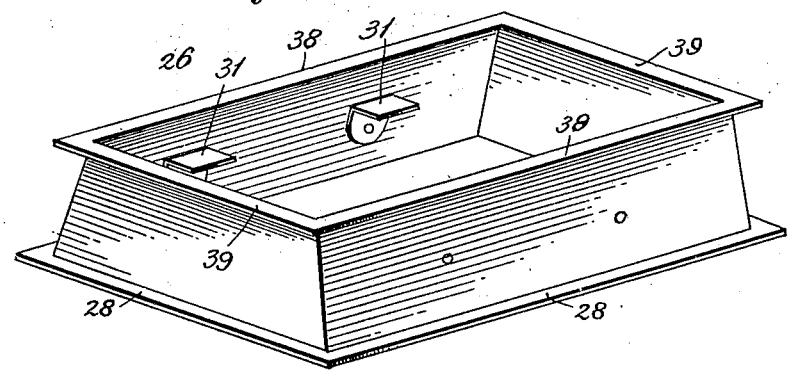
Figure 5:
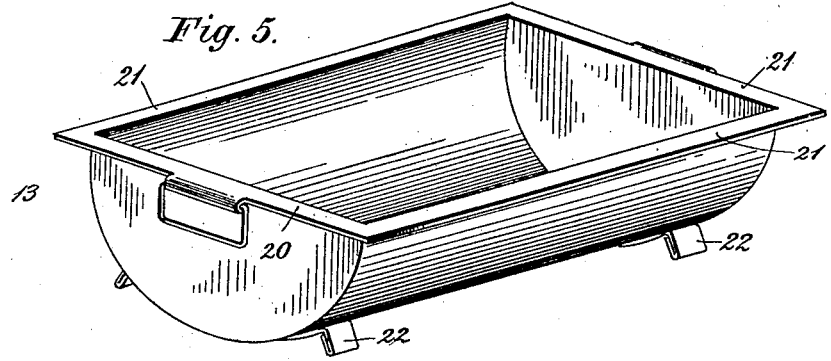
Figure 6:
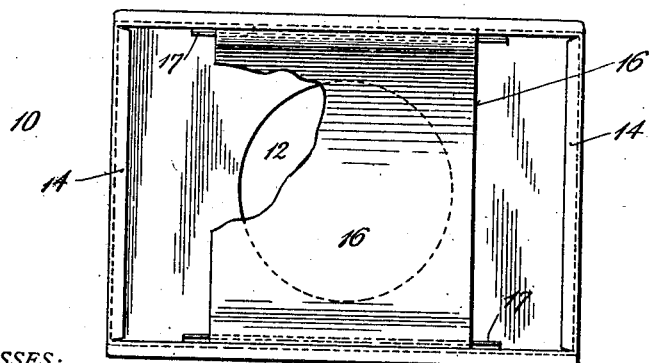

In the accompanying drawings, in which similar characters denote similar parts, Figure 1 is a perspective view of my improved cooking utensil in its complete form. Fig. 2 represents a central longitudinal section thereof. Fig. 3 is a vertical cross section on line 3 3 of Fig. 2. Fig. 4 is a perspective view of the steam section. Fig. 5 shows a similar view of the roaster, and Fig. 6 represents a top view of the heat chamber.

As above stated, my invention comprises as one of its features, a heat chamber which constitutes an oven to be used on top of a range and which enables the heat to reach the sides of the roaster as well as the bottom thereof. This heat chamber is designated in the drawings by the numeral 10, and preferably comprises a bottom plate 11, having an aperture 12 through which the heat from the fire may rise into the interior and surround the roaster or food receptacle 13, which in its preferred form has a round bottom, (see Fig. 3), so that the juices and other liquids of the food may extend over only a small area and consequently be less apt to boil away, as would be the case in a flat bottom pan.

Means are provided for positioning the receptacle 13 within the heat chamber 10 so as to leave an air space $a$ between the walls of the receptacle and the chamber, respectively, these means consisting preferably of flanges 14 projecting inward from the end walls 15 of the heat chamber, which latter is also provided with a deflector plate 16 disposed directly over the aperture 12 and so as to leave an air space $b$ between it and the bottom of the receptacle 13. It will therefore be understood that the heat of the fire cannot come into direct contact with the food receptacle 13, and also that this heat will, by virtue of the deflector 16, follow the direction indicated by arrows in Figs. 2 and 3, thus distributing the heat substantially uniformly within the chamber 10.

Now it is evident that the deflector surface adjacent the aperture 12 will naturally be exposed to the destructive forces of the fire, and may become overheated, in which case the deflector would be apt to break or crack, thus rendering it necessary either to expose the roaster itself to the fire, or to replace the burned deflector by a new one. Hence I deem it advantageous to secure the deflector in place so that it may be removed when desired, the particular manner of fastening being clearly shown in Fig. 3, in which 17, 17 denote a pair of strips secured by rivets $r$ to the side walls 18, 18, of the heat chamber and adapted to receive in the channels or grooves thus formed, end flanges 19, 19, established by return-bends of the end-portions of the deflector plate.

While under ordinary circumstances the constituent parts of the utensil thus far described, may be used in combination, yet the receptacle 13, (which normally rests with its flanges 20, 21, on the top of the chamber 10), may be readily removed therefrom and placed into the oven of a range, feet 22 being provided to maintain the roaster 13 in upright position.

From the foregoing it will be understood that although the receptacle 13 and chamber 10 constitute a necessary combination when the device is to be used on top of a range, the chamber 10 may be dispensed with, when the receptacle 13 is to be used in the range-oven.

Disposed in the receptacle 13, is a tray 25, preferably consisting of a foraminated metal plate of such width as to leave ample space for the accumulation of the juices and liquids of the food, and also removably supported in the pan, to facilitate the removal of the liquid and also to afford better opportunity for cleansing the tray.

The top of the receptacle 13 may be covered in any suitable manner, but, inasmuch as I deem it advantageous to utilize the heat and the steam generated within the roasting pan for cooking or steaming vegetables at the same time, a casing or section 26 is placed on top of the receptacle, both of these parts being positioned relatively to each other by flanges 27 entering the top of the receptacle, and also by side flanges 28 which rest upon the flanges 20, 21 above mentioned, and thus make a comparatively tight joint all around.

Secured to the side walls 29, 30, of the upper section 26, are brackets 31 adapted to support a grate 32 preferably made of woven wire, or which may be in the shape of a basket to receive vegetables, so that the steam generated by the boiling of the liquid in the bottom or "well" of the receptacle, may permeate and cook the contents of the grate 32, thus imparting to the food a rich flavor which plain water or steam cannot impart. It is, furthermore, a point worthy of note, that the process of cooking vegetables by steam instead of boiling them in a body of water, will as a matter of course occupy more time than the latter process, and, furthermore, that moist heat will cook meats more rapidly than dry heat.

In the present combination of the elements of the cooking utensil, the time for cooking both kinds of food has been practically equalized, so that the cover need not be raised until the entire contents of the utensil have been thoroughly cooked.

The section 26 may be closed by the cover 35 which is preferably made with an arched top, and has side flanges 36, and end flanges 37 to rest upon flanges 38, 39, respectively of the casing 26; while the cover is positioned relatively to the opening of the casing 26, by flanges 40, (see Fig. 3). The cover 35 may be provided with a suitable bail 41, as desired.

Attention is called to the facts:—that the cover is arched, that the extreme distance over the flanges is less than the "clear" opening of the receptacle 13, and furthermore that the casing or section 26 is of such size as to permit the same to enter, (when inverted), into the receptacle 13, so that in this manner the entire device may be stacked in compact form for transportation or shipping.

Many changes may be made in the particular construction of any of the several component elements of the device, without departing from the spirit of the invention, no attempt having been made to enter minutely into the details of forming the flanges or the corners, which may be made in any desired manner or form.

Having described my invention, I claim:—

1. The combination, with a heat chamber having walls and an apertured bottom, a food receptacle semi-circular in cross-section and having flanges resting on and closing the top of the heat chamber, and inwardly-projecting end flanges on the heat chamber for positioning said receptacle in the chamber to establish an air space between said walls and said chamber, of a curved deflector plate disposed over said aperture and spaced from the food receptacle, thereby forming an air space between said deflector and the receptacle, and means carried by the heat chamber for supporting said deflector.

2. The combination, with a heat chamber having an apertured bottom, a food receptacle semi-circular in cross-section and having flanges resting on and closing the top of the heat chamber, and means for positioning said receptacle in the heat chamber to establish an air space between the walls thereof and said heat chamber, of a steam section having flanges resting on the flanges of the food receptacle thereby forming a closed joint, and a cover for the steam section.

ROBERT M. AUSTIN.

Witnesses:
JOHN F. DOEBLER,
CHAS. F. SCHMELZ.